United States Patent
Osakada et al.

(10) Patent No.: US 6,308,239 B1
(45) Date of Patent: Oct. 23, 2001

(54) INTERFACE SWITCHING APPARATUS AND SWITCHING CONTROL METHOD

(75) Inventors: Hideyuki Osakada, Fujisawa; Ryuichi Hattori; Yukihiro Seki, both of Yokohama, all of (JP)

(73) Assignee: Hitachi, Ltd.

( * ) Notice: Subject to any disclaimer, the term of this patent is extended or adjusted under 35 U.S.C. 154(b) by 0 days.

(21) Appl. No.: 08/964,603

(22) Filed: Nov. 5, 1997

(30) Foreign Application Priority Data

Nov. 7, 1996 (JP) .................................................. 8-294862

(51) Int. Cl.⁷ .............................. G06F 13/14; G06F 13/00
(52) U.S. Cl. ............................. 710/131; 710/38; 710/129
(58) Field of Search ................................... 710/131–132, 710/38

(56) References Cited

U.S. PATENT DOCUMENTS

| | | | |
|---|---|---|---|
| 3,593,302 | * 7/1971 | Saito et al. | 395/857 |
| 4,004,277 | * 1/1977 | Gavril | 710/23 |
| 4,608,663 | * 8/1986 | Gordon | 710/46 |
| 5,297,262 | * 3/1994 | Cox et al. | 710/36 |
| 5,307,462 | * 4/1994 | Hastings | 710/10 |
| 5,499,377 | * 3/1996 | Lee | 709/244 |
| 5,561,822 | * 10/1996 | Ham | 710/36 |
| 5,638,521 | * 6/1997 | Buchala et al. | 710/131 |
| 5,684,789 | * 11/1997 | Habeck et al. | 370/244 |
| 5,721,844 | * 2/1998 | Chang | 710/131 |

OTHER PUBLICATIONS

Brown, Bruce, "Getting more from your printer . . . ", Computer Shopper, Feb. 1992, v12, n2, p532(5).*
O'Malley, Christopher, "Connectivity made simple", Personal Computing, Mar. 1990, v14, n3, p93(6).*
Universal Serial Bus Specification, Version 1.0, Jan. 15, 1996, pp. 27–28.
"ASCII/V Mar. Issue", published by ASCII in Feb. 1996, p. 192.

* cited by examiner

Primary Examiner—Sumati Lefkowitz
(74) Attorney, Agent, or Firm—Mattingly, Stanger & Malur, P.C.

(57) ABSTRACT

In order to share a device among a plurality of hosts, a switching section is adapted to select one of the hosts by switching and connect it to the device by a serial interface. The switching section can be controlled from the particular host through at least an interface cable. When the switching section switches the host to be connected with the device, power continues to be supplied to the device. Further, a connection recognition protocol to be transmitted from the device when beginning to supply power to the device is transmitted from the switching section. In this way, a quick switching operation free of protocol contradictions is made possible without causing any hardware resetting of the device.

7 Claims, 12 Drawing Sheets

INTERFACE SWITCHING APPARATUS AND SWITCHING CONTROL METHOD

BACKGROUND OF THE INVENTION

The present invention relates to an interface switching apparatus and a switching control method wherein a plurality of information processing systems (hereinafter referred to as the hosts) having a serial interface capable of dynamic insertion and removal can share at least a peripheral device (hereinafter referred to as the device) having the same serial interface. The present invention also relates to a device which can be shared by a plurality of hosts. The present invention further relates to the interface switching apparatus and the switching control method in which a USB (Universal Serial Bus) is applied to the serial interface.

The use of the USB is extending as a serial interface for connecting the peripheral units (devices) such as a keyboard and a mouse to the information processing systems (hosts).

The USB specification is briefly described in "UNIVERSAL SERIAL BUS SPECIFICATION version 1.0 (Jan. 15, 1996), pp. 27–28, available from the U.S. USB Implementers Forum (URL on internet is http://www.usb.org/).

Each USB host is basically connected with one USB device. The use of a USB hub having the port repeater function, however, makes it possible to connect a plurality of USB devices to each USB host.

In addition to USB, a serial interface called IEEE1394 is finding applications. IEEE1394, like USB, is capable of dynamic insertion and removal and can be added through a hub. The data transfer rate of the USB is about 12 MBits/sec at maximum, whereas IEEE1394 specified by IEEE has a data transfer rate as high as 400 MBits/sec.

In recent years, a system called "a cluster" is extending as a system for improving the reliability of information processing systems, in which each of a plurality of information processing systems monitors the operations of the other information processing systems and is ready to switch various processes to a normal system in case of a fault. The cluster system is configured of a plurality of servers, and in order to reduce the installation space, the devices such as the monitors, the keyboards and the mice (hereinafter referred to as "the console devices") are desirably shared in use.

Conventional means for sharing the console devices is switching a monitor signal or a keyboard signal by a switch. The journal "ASCII/V, March Issue" published by ASCII in February 1996, p. 192 discloses a keyboard switch for performing a switching operation by depressing a specified combination of keys on the keyboard.

SUMMARY OF THE INVENTION

Among the various console devices, the interfaces of the keyboard and the mouse have been increasingly using the USB. According to the USB specification, however, connection of a device to a plurality of USB hosts is not permitted. For a given USB bus, for example, only one USB host can exist at a time.

The first problem, therefore, is that in sharing a console among a cluster system or among a plurality servers, a USB console device such as a keyboard or a mouse cannot be connected to a plurality of hosts at a time.

A possible solution to this method is to switch the route of connection between a USB device and a USB host by normal switching means as in the prior art. In the USB, however, the dynamic insertion and removal function requires the process of disconnecting and connecting the USB signal each time the switch is operated. As in the normal dynamic insertion and removal operation, therefore, a hardware reset control of a device is executed based on the USB specification. The second problem is that a simple switching circuit consumes a considerable time before a USB device becomes usable each time of switching by the hardware reset operation accompanying the dynamic insertion and removal operation.

The third problem is that the switching of a console has no relation with the main host of a cluster system in the conventional interface switching means using the manual switching operation. In the case where a fault is detected in a given host, for example, the console cannot be switched in response to the fail-over (the operation of switching a process at the time of a fault) of the cluster to inform the manager of the fault quickly.

The fourth problem is that if the operation of the interface switching means is to be interlocked with a fail-over of a cluster, the host is required to perform the switching control operation using a different control signal in view of the fact that the conventional keyboard interface lacks any specification of communicating such a switching command.

The fifth problem of the conventional manual interface switching means is that even an input not connected to a host could be selected. In a system constituting a three-input switch having only two hosts, example, nothing is displayed on the monitor when switched to the remaining one input so that a keyboard entry is invalid very inconveniently in the absence of a host to communicate with. The user is required to be always conscious of this limitation.

The sixth problem is that if a USB switch obviating the first or second problem described above is available, a monitor signal as well as the keyboard and the mouse is actually required to be switched. The monitor signal, however, is a video signal or governed by the IEEE1394 specification described above and requires a different interface switching means.

The seventh problem is that when a given USB keyboard is connected to another USB host having a different architecture using some switching means, the switching of the key code is required.

A first object of the present invention is to provide a USB switching apparatus, and a USB device which can be connected to a plurality of USB hosts and thus can be shared among a plurality of the USB hosts.

A second object of the invention is to provide a USB switching apparatus which can reduce the time required before a USB device becomes usable after starting to switch the USB.

A third object of the invention is to provide a USB switching apparatus which can switch the connection of a USB host in response to a command from the host in the case where a fault occurs in the USB host in a cluster configuration or the like.

A fourth object of the invention is to provide a USB switching apparatus in which a switching command can be issued from a USB host without any new control interface between the USB host and the USB switching apparatus.

A fifth object of the invention is to provide a USB switching apparatus in which the connection is not switched to a connection system with which any USB host is not connected.

A sixth object of the invention is to provide the USB switching apparatus described above, which is capable of switching the interfaces other than the USB at the same time.

A seventh object of the invention is to provide a USB keyboard capable of being connected to a USB host of a different architecture.

In order to achieve the above-mentioned objects, the present invention comprises the means described below.

The means for solving the first problem is a USB switch having an interface with a plurality of USB hosts, in which an arbitrary one of the USB hosts is selected to establish a connection route with a USB device.

The means for solving the second problem is a USB switch having an interface with a plurality of USB hosts, configured in such a manner that during the period when a connection route established between an arbitrary host and a device is switched to another arbitrary host, the device continues to be supplied with power and the host with which a connection is to be newly established is supplied with the same signal as when the device is attached dynamically. Specifically, the device continues to be supplied with power and therefore is not reset when the host is switched. Also, the host can recognize the switching of the device correctly by receiving a pseudo-dynamic insertion signal.

The means for solving the fourth problem is configured in such a manner that a switching,control command is issued from a host to a USB switch which receives the switching control command as a USB device for performing the switching operation. As a result, the host can freely control the connection route, and a new control signal is not required to be added for connecting the host and the USB switch.

The third problem can be solved by the host issuing the above-mentioned switching control command upon detection of a fault in the cluster control software.

The means for solving the fifth problem is so configured that the host-side interface of a USB switch recognizes a host-side connection or the switching power on, and the switching control of a host is invalidated in the case where the connection is not established or power is not supplied on host side.

The means for solving the sixth problem is configured in such a manner that the host switching control signal for the USB switch is used also for switching other interfaces.

The means for solving the seventh problem is configured in such a manner that a key code table is provided in the USB keyboard and switched according to the architecture of the USB host connected.

DESCRIPTION OF THE PREFERRED EMBODIMENTS

A first embodiment of the invention will be explained with reference to the accompanying drawings. The present invention is not limited to the first embodiment.

The USB switching circuit, the USB switching apparatus and the USB host selector described below are all a USB interface switching apparatus. The USB cable, on the other hand, is a transmission cable including four lines including two USB signal lines, a USB power line and a USB ground line. The two USB signal lines are differential signal lines, one of them being called a D+ signal line and the other a D− signal line. By way of explanation, the state in which communication is possible between a USB host and a USB device by a USB interface is called the USB connection (first embodiment).

Figure 1:
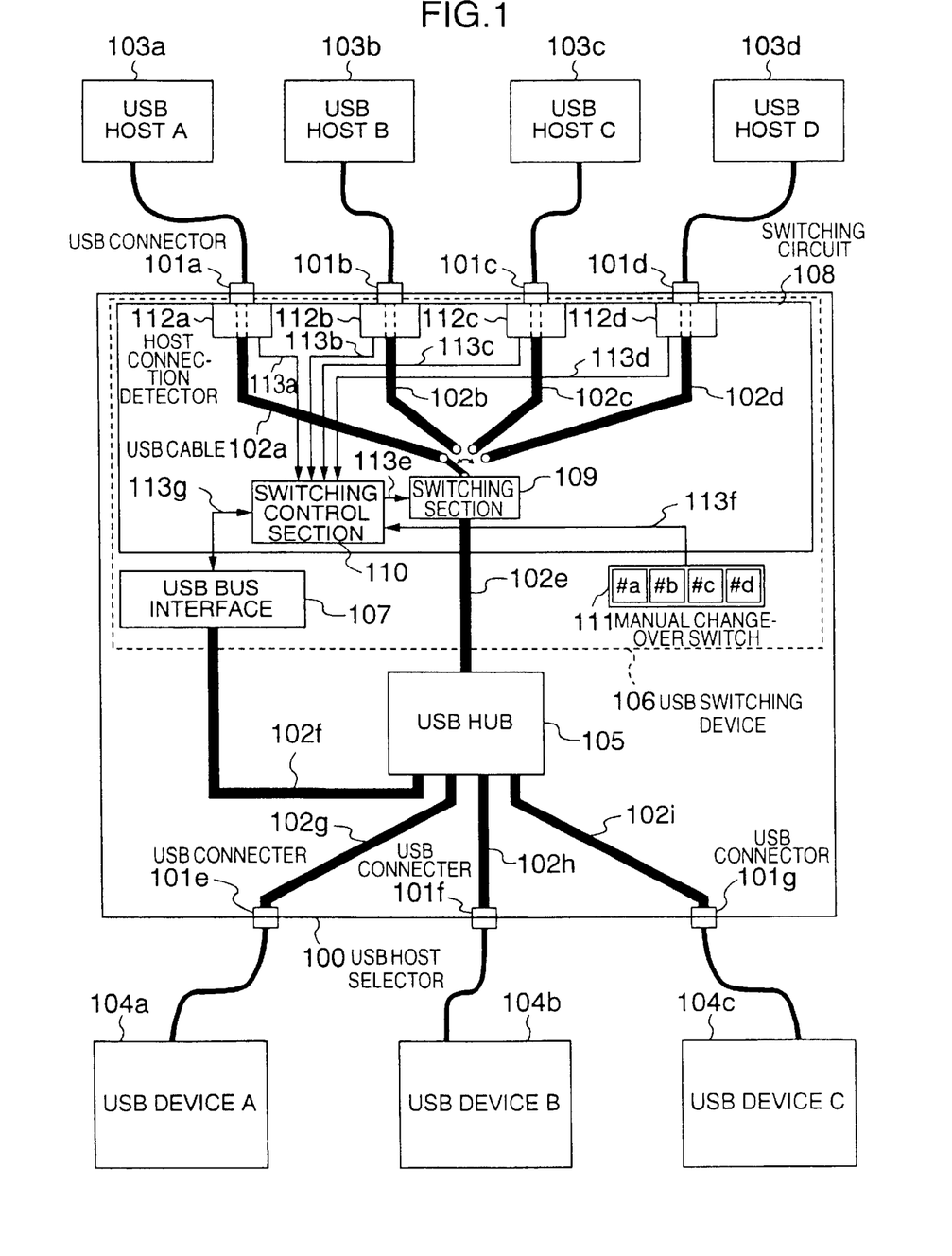
FIG. 1 is a block diagram showing a hardware configuration of a USB host selector according to a first embodiment.

FIG. 1 is a block diagram showing an example of a hardware configuration of a USB host selector 100 according to the first embodiment of the invention.

The USB host selector 100 connects a plurality of USB hosts 103a to 103d and a plurality of USB devices 104a to 104c to each other thereby to establish a connection route between the USB hosts 103a to 103d and the USB devices 104a to 104c. The internal configuration of the USB host selector 100 is described below.

Numerals 101a to 101g designate USB connectors and numeral 105 a USB hub for repeating the USB signal to a plurality of the USB devices 104.

The portion defined by the dotted line represents a USB switching apparatus 106 and constitutes a feature of the present invention. Numeral 107 designates a USB bus interface connected to a USB hub 105. The USB bus interface 107 has the functions of interpreting a switching control command issued from any of the USB hosts 103 in terms of the USB and delivering it to a switching control section 110. The internal portion of the USB switching apparatus 106 having the switching function is shown as a switching circuit 108, and the switching control section 110 is included in the switching circuit 108.

The internal portion of the switching circuit 108 that actually switches the signal is a switching section 109. This switching section 109 can be a mechanical switch or an electrical switch (such as a switch including a MOS transistor).

Numerals 112a to 112d designate host connection detectors for detecting the connection and the power-on state of the USB hosts 103. A detection result signal 113 is applied to the switching control section 110.

In FIG. 1, the switching control operation is performed in any of the methods described below. In one of the methods, the USB hosts 103 send out a switching command and the switching control section 110 interprets the command through the USB bus interface 107. Another method is the direct switching by the user operating a manual change-over switch 111. Still another method consists in controlling not to switch to any of the USB hosts 103 not connected or not powered on according to the result of detection by the host connection detectors 112.

In the method of switching by operating the manual change-over switch 111 directly, the switching control section 110 performs priority control as to the switching control command issued from the USB hosts 103.

Figure 2:
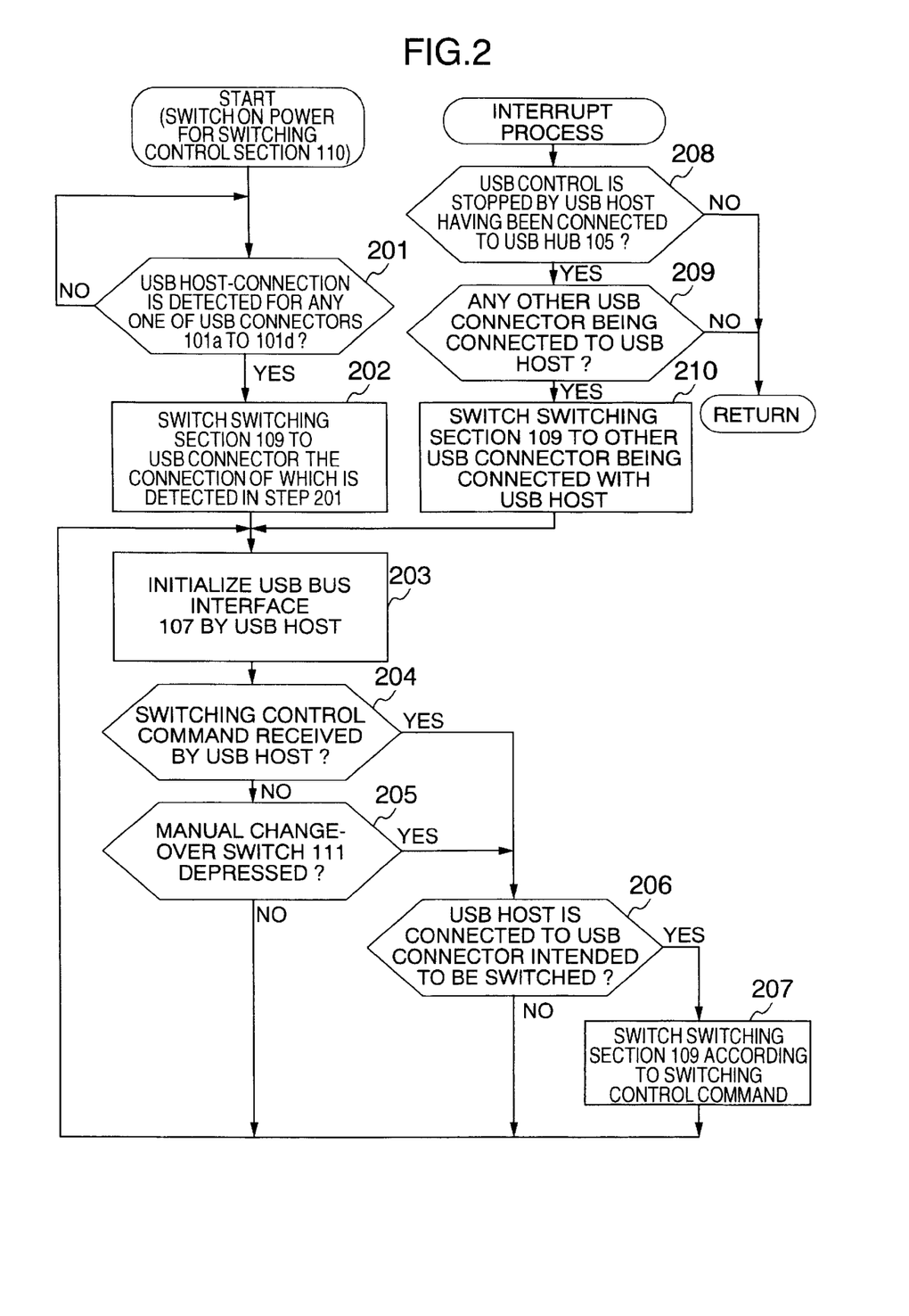
FIG. 2 is a flowchart showing the operation of a switching control section of the USB host selector of FIG. 1.

FIG. 2 shows an example of a flowchart showing the operation of the switching control section 110.

Step 201 executed after switching on power checks whether at least one USB host 103 correctly switched on is connected to any one of the USB connectors 101a to 110d.

Step 202 switches the switching section 109 to an arbitrary one of valid USB hosts.

In step 203, the USB bus interface 107 and the USB devices 104a to 104c connected to the USB connectors 101e to 101g are initialized in response to an initialization command (reset signal) transmitted from a specified USB host 103 with the route thereof established by switching after power is switched on. The detection and initialization of the USB devices is described in "UNIVERSAL SERIAL BUS SPECIFICATION version 1.0 (Jan. 15, 1996), pp. 165–171".

Upon completion of execution of the above-mentioned steps, the route between a console device and a host is established as viewed from the user, and the keyboard entry and the monitor display are made possible.

Assuming that a switching command is issued by a USB host 103 connected, it is detected in step 204 and the process proceeds to step 206. In the case where the user issues a switching command manually, on the other hand, the process proceeds from step 205 to 206.

Step 206 checks whether the USB host 103 to be switched is correctly connected, and step 207 switches the switching section 109.

After switching in step 207, the process returns not to step 204 but to step 203. This is by reason of the fact that the switching of the USB hosts 103 requires the initialization of the USB devices 104.

Steps 208 to 210 represent a flow for the case in which the USB host 103 that has thus far been connected is deactivated or disconnected for some reason or other. In the case shown, the detection by the host connection detectors 112 is notified by interruption to the switching control section 110.

If a valid USB host 103 exists other than the USB host 103 that has established its route (step 209), a command is issued to switch to the valid USB host (step 210). This process permits an invalid console to be disconnected quickly.

The first embodiment described above with reference to FIGS. 1 and 2 is an example of a solution to the first, fourth and fifth problems.

A second embodiment of the invention will be described below.

Figure 3:
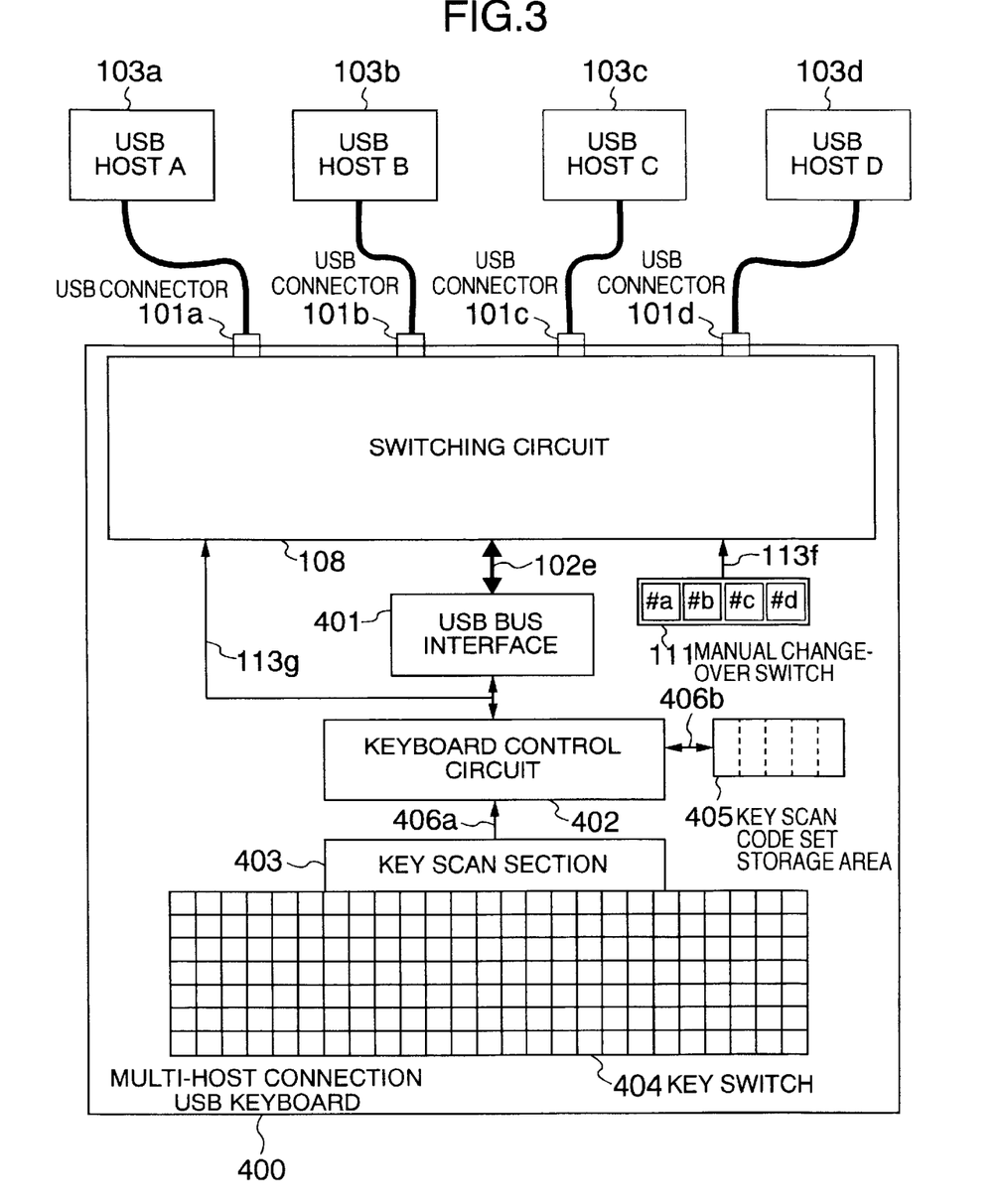
FIG. 3 is a block diagram showing a hardware configuration of a multi-host connection USB keyboard according to a second embodiment.

FIG. 3 is a block diagram showing a hardware configuration of a multi-host connection USB keyboard 400 according to the second embodiment of the invention.

The feature of this multi-host connection USB keyboard 400 is that it includes the switching circuit 108 of FIG. 1 and also a key scan code storage area 405 for meeting the requirements of a plurality of USB hosts of different architecture as desired. This multi-host connection USB keyboard 400 will be briefly described below.

A key scan section 403 reads the depression of a key switch 404, and sends key entry information to a keyboard control circuit 402. The keyboard control circuit 402 converts the key scan code using a key scan code set corresponding to the type of a particular USB host 103, and sends it to the particular USB host 103 through a USB bus interface 401 and a switching circuit 108.

The key scan code set storage area 405 holds a table showing key entries and corresponding scan codes. The architecture of the USB host is not specified for the USB, and therefore the USB may be connected to a USB host 103 of a different architecture by the USB switching circuit 10.

Once a scan code is selected at the time of establishing the route with an arbitrary USB host in the switching circuit 108, a corresponding key scan code can be output regardless of the architecture of the USB host 103 connected. For selecting a scan code, a USB connector 101 corresponding to each scan code is determined in advance, or the type of each USB host is determined by some means at the time of switching on power, or a corresponding scan code can be transmitted as a part of the initialization command from the USB hosts 103 each time of the switching operation of the switching circuit 108.

A third embodiment of the invention will be described below.

Figure 4:
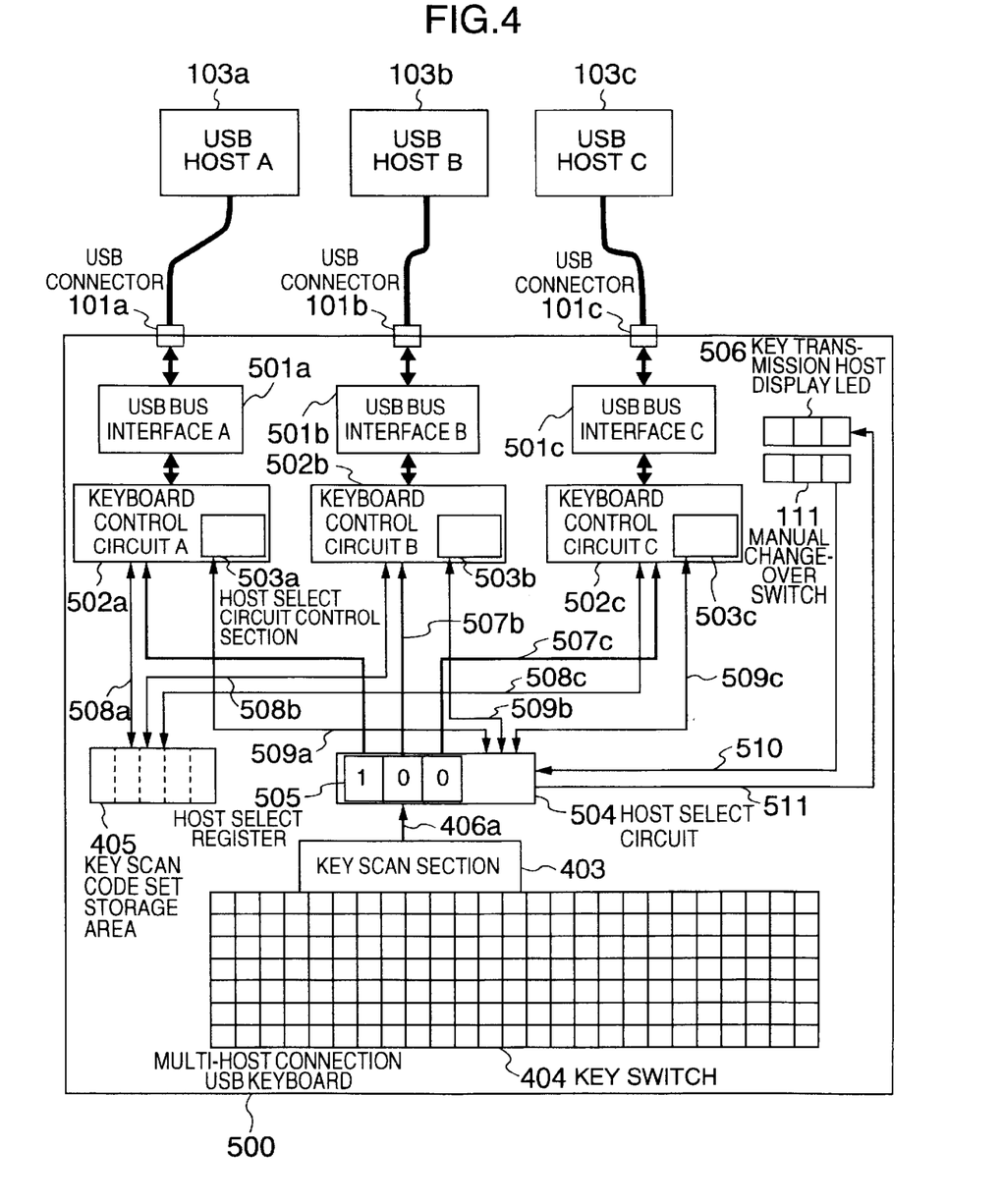
FIG. 4 is a block diagram showing a hardware configuration of a multi-host connection USB keyboard according to a third embodiment.

FIG. 4 is an example of a derivation of the multi-host connection USB keyboard 400 shown in FIG. 3. The multi-host connection keyboard according to this embodiment is different from the multi-host connection USB keyboard shown in FIG. 3 and therefore is designated illustratively by numeral 500.

The feature of this invention lies in a plurality of keyboard control circuits 502a to 502c and a host select circuit 504 by which a keyboard entry can be output to a plurality of arbitrary USB hosts 103. In other words, a key entry on the keyboard can be broadcast.

The host select circuit 504 has built therein a host select register 505. In accordance with the setting of this host select register 505, the key entry is transmitted to the keyboard control circuits 502. Each of the keyboard control circuits 502 accesses the key scan code setting storage area 405 and thus outputs a key code corresponding to the architecture of the USB host 103 connected to the route of the particular keyboard control circuit 502.

The host select control section 503 built in each keyboard control circuit 502 sets the host select register 505 as to whether a key code is to be transmitted to the route of the particular host select control section 503. The command for this operation is the same command that the corresponding USB host 103 has issued to the particular keyboard control circuit 502 through the corresponding USB bus interface 501.

The host select circuit 504 transmits the key entry information received from the key scan section 403 to the keyboard control circuit 502 associated with the bit value "1" of the host select register 505 through the corresponding signal line 507. No key entry information is sent to a keyboard control circuit 502 having a bit value "0". In the case where a plurality of bit values of the host select register 505 are "1", the key entry information is transmitted simultaneously to the corresponding keyboard control circuits 502.

Each keyboard control circuit 502 monitors whether the corresponding USB host 103 is correctly connected. Upon detection of a disconnection by a keyboard control circuit 502, the host select circuit control section 503 associated therewith sets the corresponding bit value of the host select register 505 of the host select circuit 504 to "0" automatically, thus improving the operating convenience of the user. The connection or disconnection is displayed on a key transmission host display LED 506.

A fourth embodiment of the invention will be described below.

Figure 5:
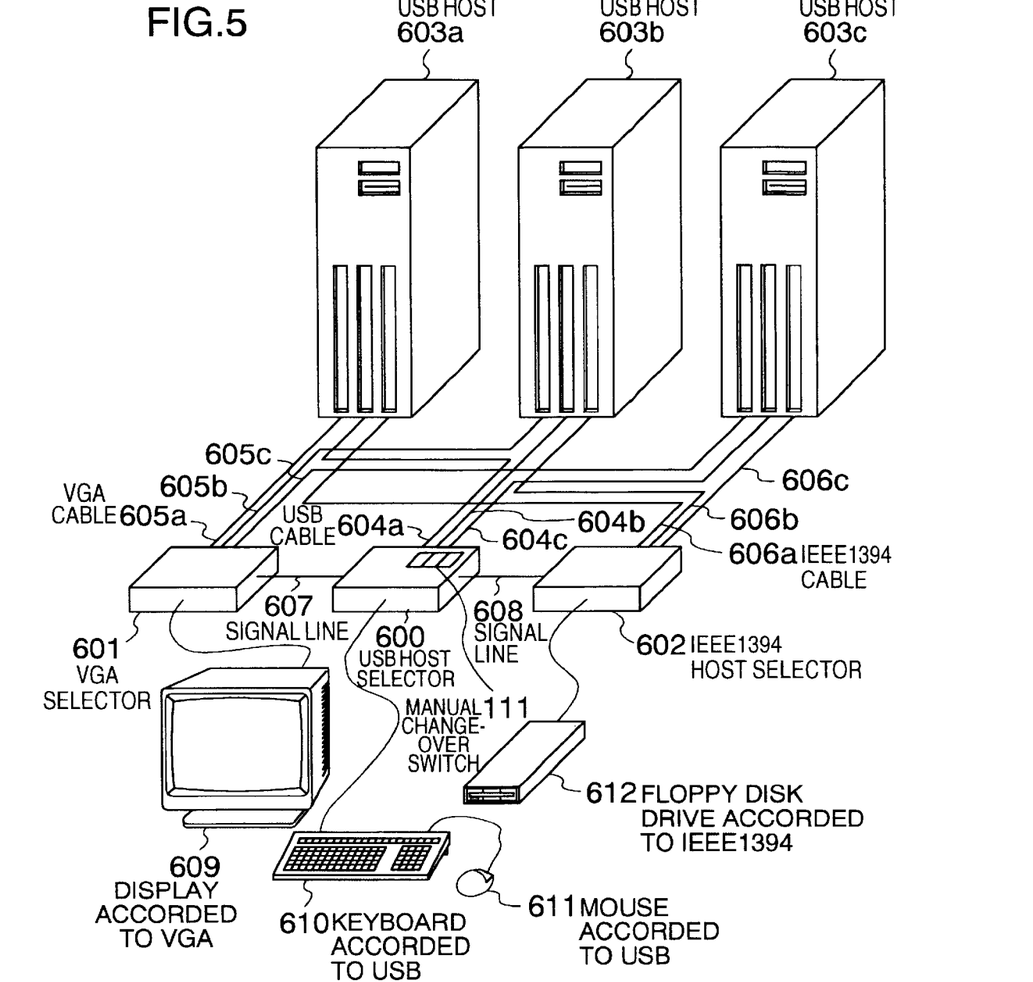
FIG. 5 is a perspective view of wirings using a USB host selector according to a fourth embodiment.

FIG. 5 shows an embodiment for solving the sixth problem. The USB host selector is designated by numeral 600 for express distinction.

The feature of this invention resides in that the USB host selector is connected to a VGA selector 601 and an IEEE1394 host selector 602.

The USB host selector 600 establishes a route by switching the connection between the USB hosts 603a to 603c on the one hand and the keyboard 610 accorded to USB and the mouse 611 accorded to USB on the other hand. The VGA selector 601 switches the VGA signals 605 output from the USB hosts 603 and establishes a connection route to the display 609 accorded to VGA. The IEEE1394 host selector 602 switches the IEEE1394 cables 606 connected with the USB hosts 603, and thus establishes a route with an IEEE1394 device. In FIG. 5, a floppy disk drive 612 is assumed to be connected as such a device.

The operation of the USB host selector 600 is different from that of the USB host selector 100 explained above in that output signal lines 607, 608 are led out from the USB host selector 600. The other aspects of the operation basically remain the same and will not be described.

Figure 6:
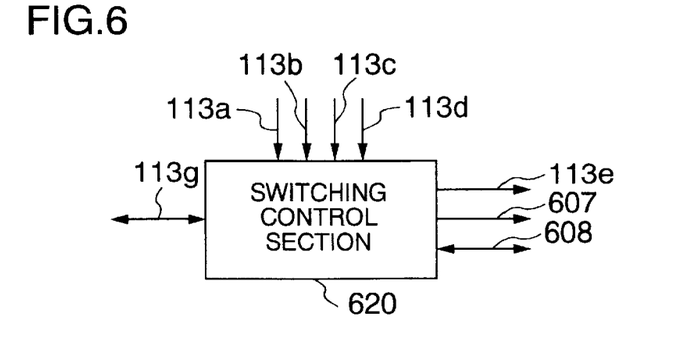
FIG. 6 is a block diagram showing the connection of the switching control section of the USB host selector of FIG. 5.

FIG. 6 is a diagram showing the relation between the input and output signals of the switching control section 620 built in the USB host selector 600. The switching control section 620 corresponds to the switching control section 110 shown in FIG. 1.

The feature of the switching control section 620 shown in FIG. 6 is different from that of the switching control section 110 in that the output signal lines 607 and 608 are led out from the switching control section 620. The signals from the signal lines 607 and 608 are output based on the switching of the USB hosts 603 for controlling the switching operation of the VGA selector 601 and the IEEE1394 host selector 602.

The internal configuration of the VGA selector 601 is similar to that of the conventionally known switching device and will not be described. The internal configuration of the IEEE1394 host selector 602, on the other hand, can be considered basically identical to that of the USB host selector 600 except for the difference in the interface specification.

Figure 7:
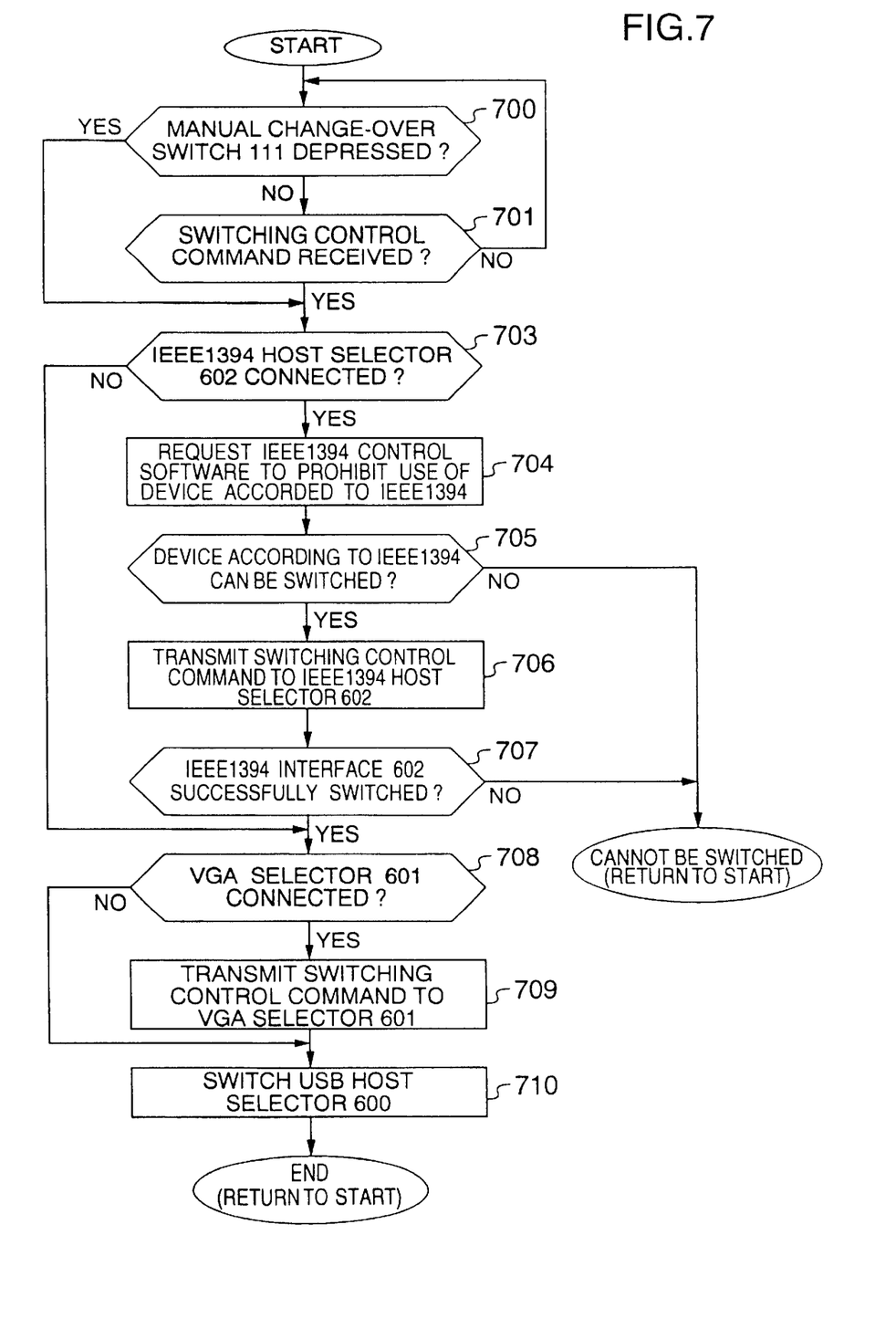
FIG. 7 is a flowchart showing the operation of the switching control section of FIG. 6.

FIG. 7 is a diagram showing an example of the flow of the switching operation of the USB host selector 600.

Steps 700 and 701 judge whether the operator has depressed the manual change-over switch 111 or has received a switching control command from any of the USB hosts 103. The process then proceeds to step 703.

Step 703 judges whether or not the IEEE1394 host selector 602 is connected. In the case where the IEEE1394 is connected, step 704 requests the IEEE1394 control software on the USB hosts 603 to prohibit the use of the device accorded to IEEE1394 in order to prevent the switching operation from being performed while data is being transmitted or received by the floppy disk drive 612.

In step 705, the USB control software operating on the USB hosts judges, by inquiry to the IEEE1394 control software or otherwise, whether the floppy disk drive 612 can be switched. If the judgement is that the floppy disk drive 612 can be switched, then step 706 sends out a switching control command through the signal line 608 to the IEEE1394 host selector 602, and step 707 confirms the transmission through the signal line 608.

Step 708 judges whether or not the VGA selector 601 is connected, and if connected, step 709 sends out a switching control command through the signal line 607 to the VGA selector 601.

Step 710 switches the USB host 603 connected to the keyboard 610 according to USB and mouse 611 according to USB.

Figure 8:
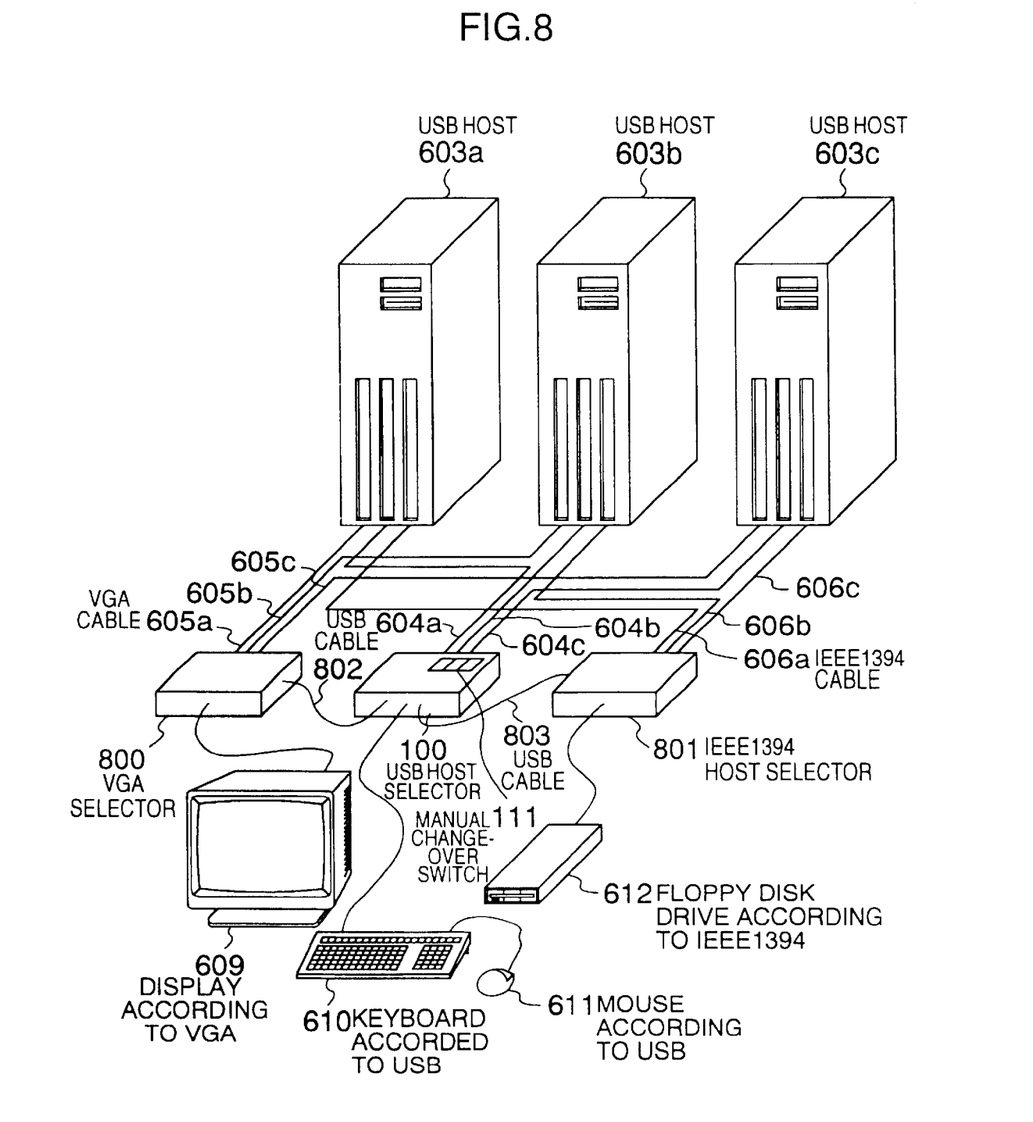
FIG. 8 is a perspective view showing wirings using a USB host selector according to the fourth embodiment.

FIG. 8 shows an example of a configuration in which a VGA selector 800 and an IEEE1394 host selector 801 are used as the USB devices 104, respectively. The USB host selector 100 has built therein the USB hub 105 shown in FIG. 1, and is adapted to transmit a switching control command to the VGA selector 800 and the IEEE1394 host selector 801. This configuration eliminates the need of defining a special protocol for the signal lines 607, 608 in FIG. 6, and a configuration is possible based on the commercially-available multi-purpose LSI used for the USB.

The configurations shown in FIGS. 5 to 8 make it possible to switch the three interfaces including USB, IEEE1394 and VGA, thus solving the sixth problem. The VGA selector 601 or 800 and the IEEE1394 host selector 602 or 801 can be integrally encased in a housing with the USB host selector 600 or 100, respectively, without any problem.

A fifth embodiment of the invention will be described below.

Figure 9:
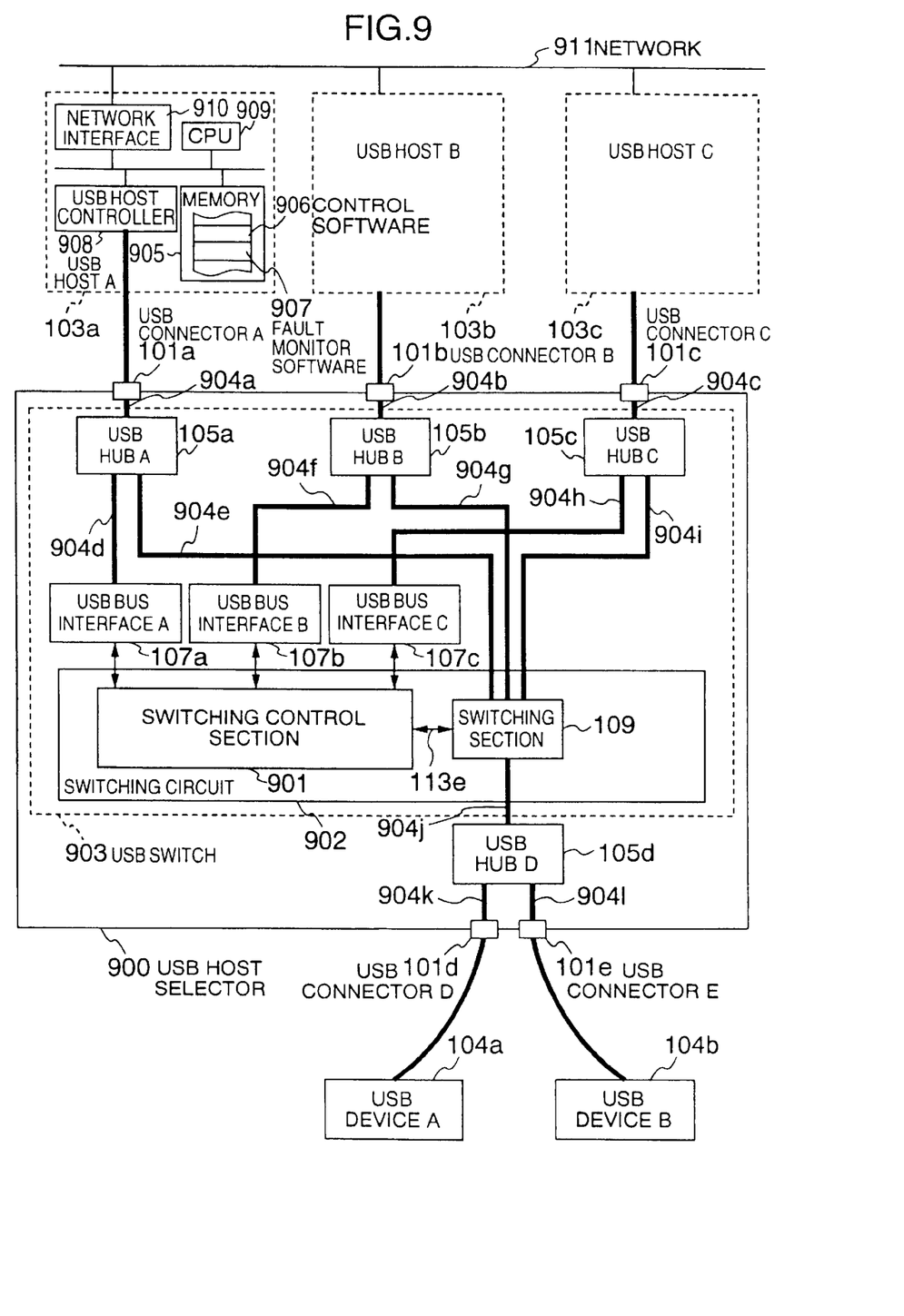
FIG. 9 is a block diagram showing a hardware configuration of the USB host selector according to a fifth embodiment.

FIG. 9 shows an embodiment for obviating the third and fourth problems. Due to the difference in internal configuration, the USB host selector is designated by a different reference numeral 900 for apparent distinction.

The feature of this USB host selector 900 lies in that as many USB bus interfaces 107 as the USB connectors 101 associated with the USB hosts 103 are included.

In the configuration example of FIG. 1 including only one USB bus interface 107, a switching control command can be issued only from the USB host 103 of which the connection is established. This is by reason of the fact that the switching control section 110 is connected to a route established through the USB bus interface 107.

In FIG. 9, on the other hand, USB hubs 105 are disposed immediately under the USB connectors 104 associated with the USB hosts 103, and USB signal lines 904d, 904f, 904h branched from the respective USB hubs 105 are applied to the USB bus interface 107. With this configuration, a switching control command from an arbitrary USB host 103 can be applied to a switching control section 901.

The configuration of the USB host selector 900 shown in FIG. 9 is applicable to the USB host selectors 600 and 100 in FIGS. 5 and 8.

Figure 13:
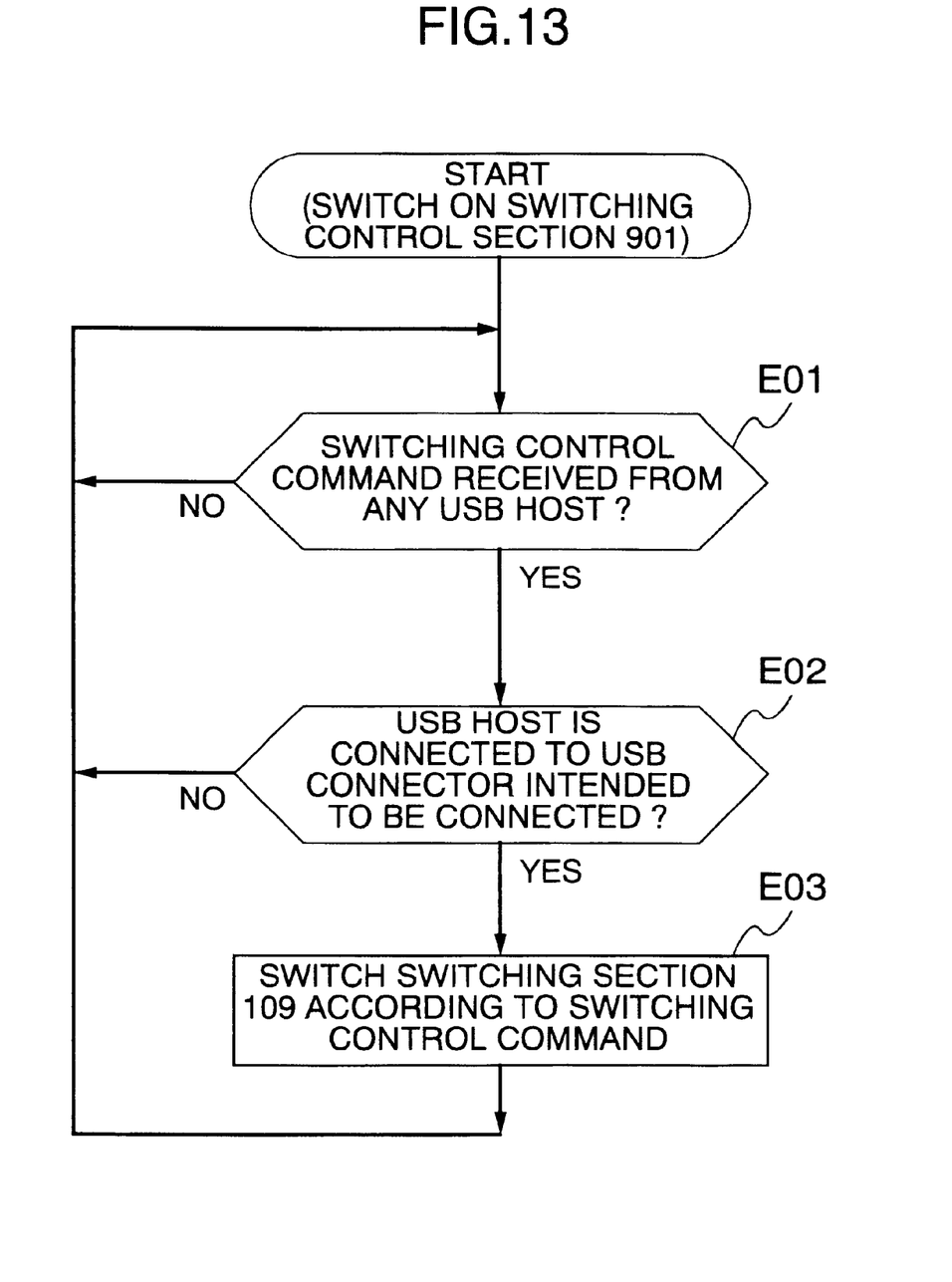
FIG. 13 is a flowchart showing the operation of the switching control section of FIG. 9.

An example of the flow of operation of the switching control section 901 for realizing the distinguished functions of the USB host selector 900 will be explained with reference to FIG. 13.

After power is switched on, step E01 detects the receipt of a switching control command from at least a USB host 103. Step E02 is for preventing a connection route from being established to invalid USB hosts 103. The fifth problem thus is solved.

In step E01, it may happen that a switching control command is received from a plurality of USB hosts 103 at the same time. Actually, therefore, various protective means such as exclusive control are required. This is, however, an implementation problem and will not be described herein.

As an application of this configuration, a cluster system made up of each USB host 103 is illustrated in the upper portion of FIG. 9. Fault monitor software 907 constitutes part of the cluster control software and communicates with other USB hosts 103 through a network 911 connected to the network interface 910 associated with each USB host. Each fault monitor software 907 notifies the other fault monitor software 907 that it is "active" by sending a packet or the like means at regular intervals of time.

Figure 12:
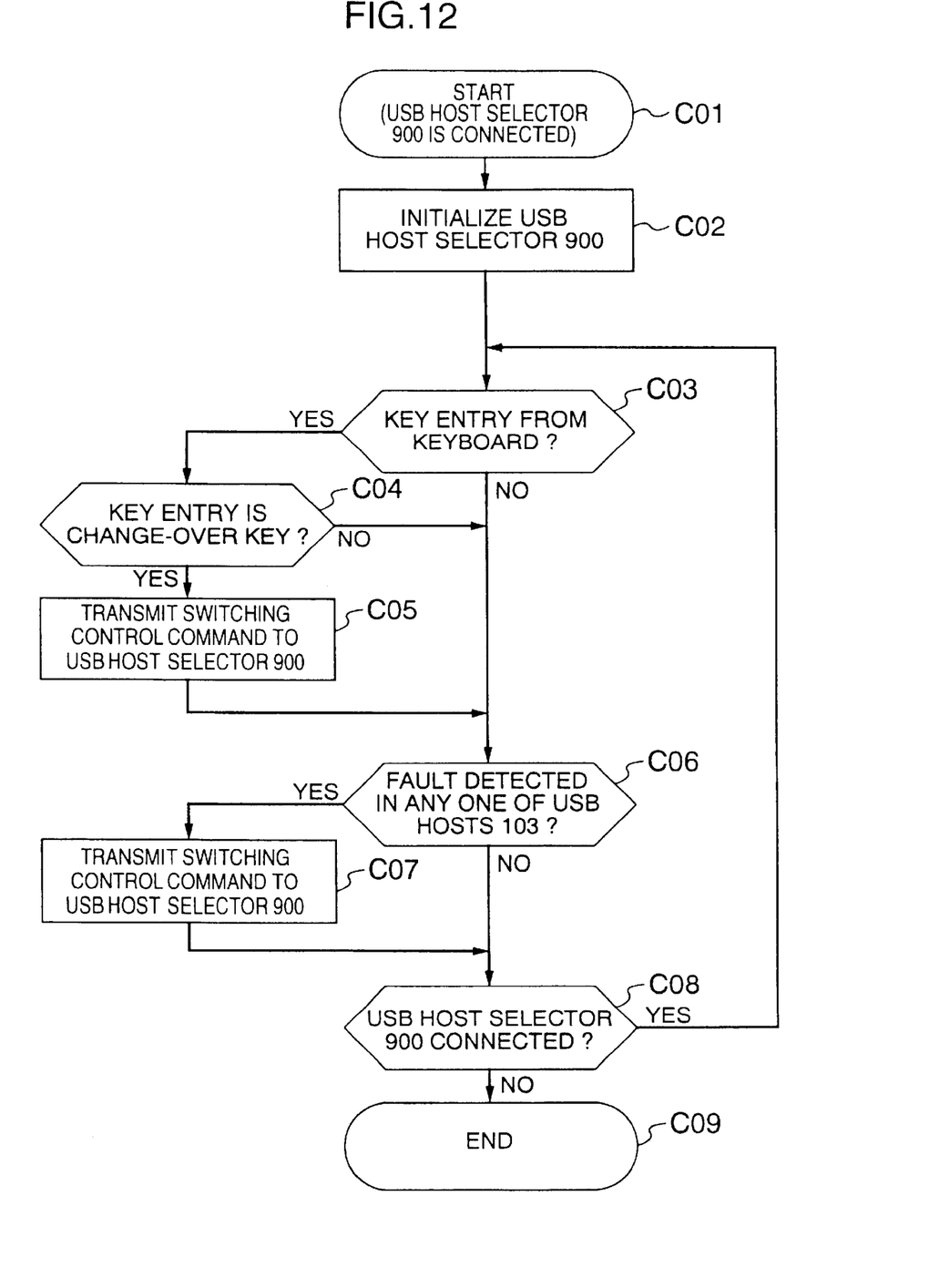
FIG. 12 is a flowchart showing the operation of the control software for FIG. 9.

The control software 906 constitutes a feature of the present invention and controls the USB host selector 900 in cooperation with the fault monitor software 907. An example of the control operation flow of the USB host selector 900 is shown in FIG. 12.

After power is switched on or otherwise, the USB host controller 908 recognizes the USB host selector 900 (step C01), and then a CPU 909 executes step C02 for initializing the USB host selector 900 in accordance with the USB protocol.

Step C03 judges whether a signal is applied by key entry from the keyboard constituting one of the USB devices 104, and if there is any key entry, step C04 judges whether the key combination constitutes a command for switching the USB host. Step C05 transmits a switching control command to the USB host selector 900.

Step C06 communicates with the fault monitor software 907 and detects whether or not a fault has occurred in any one of the USB hosts 103. If a fault is detected, step C07 transmits a switching control command to the USB host selector 900 for switching to the USB host 103 suffering from the fault. Alternatively, a switching control command can be transmitted to the USB host selector 900 for switching to the USB hosts 103 not suffering from the fault.

The former switching process, in which the operation is switched automatically to the USB host 108 suffering from a fault, allows the manager to read the fault information quickly from the monitor and to input required data from the keyboard to the USB host 103 suffering from the fault.

The latter switching process is based on the idea that switching to a system in operation is better in view of the probable fact that the USB host 103 suffering from a fault has nothing displayed on the monitor or a keyboard entry for a faulty USB host is invalid.

Which of the above processes to be selected can be specified by the manager giving a prior instruction to the control software 906. Such a selection can also depend on the degree of the particular fault.

As described above, a combination of the control software 900 and the fault monitor software 907 can realize a console switching operation interlocked with a fault in any system including a cluster.

A sixth embodiment of the invention will be explained below.

Explanation will be made about a specific example of a configuration of a switching section 109 included in the USB host selectors 100, 600, 900 and the multi-host connection USB keyboard 400.

First, the problem involved will be explained again. Since the USB is a dynamic insertion and removal interface, the USB devices 104 can be connected or disconnected at an arbitrary timing with the USB host 103 supplied with power.

The case in which a USB device 104 is connected will be described in detail. The USB devices 104 are supplied with power from the USB hosts 103 through the USB cables and have the internal reset circuit activated. This will hereinafter be called the hardware resetting. In the process, the USB device 104 connected sends a signal to the corresponding USB host 103 indicating that the particular USB device 104 is connected. Upon receipt of this signal, the USB host 103 sends a reset command to the USB device 104 newly connected. The USB device initializes the internal circuit conditions thereof. This operation is hereinafter referred to as the software resetting.

Generally, this initialization process consumes a considerable time. Suppose it takes several seconds from the time point when the USB hosts 103 are switched by the USB host selector until an entry is possible from the USB keyboard. The operating convenience on the part of the operator would be considerably adversely affected.

In view of this, the present invention takes note of the fact that if the USB device is subjected to the software resetting, the hardware resetting is not necessarily required at the time of switching the USB hosts 103.

Figure 10:
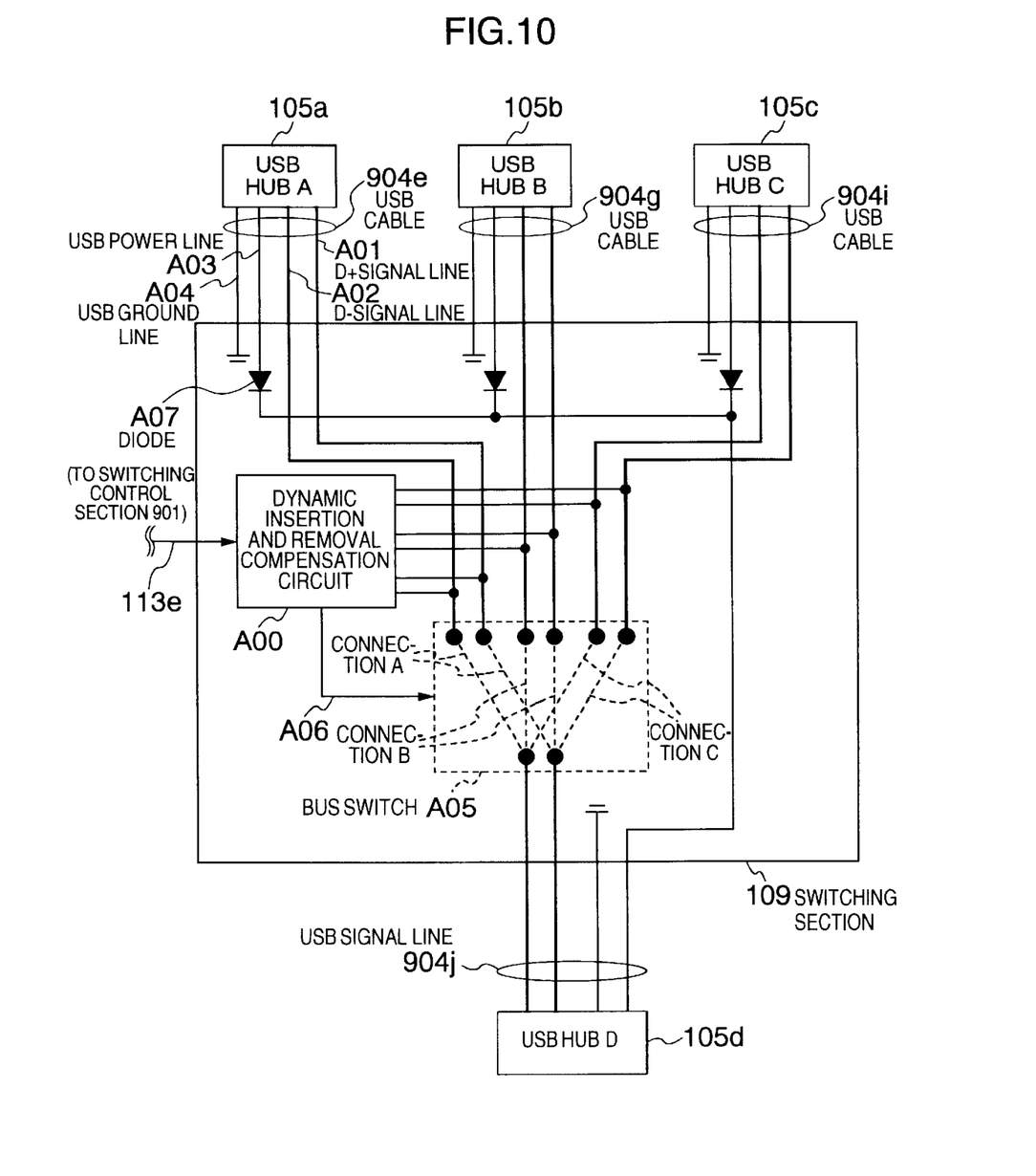
FIG. 10 is a block diagram showing a hardware configuration of the switching section of FIG. 9 according to the fifth embodiment.

FIG. 10 shows an example of a block diagram showing a hardware configuration of the switching section 109. First, explanation will be made about a means for preventing the USB device 104 from being subjected to hardware resetting. The hardware resetting is effected in order to initialize the internal circuits of the USB device 104 after power is switched on. The detection of the activation of the power line A03 among the USB signal lines 904 provides a motive of hardware resetting.

According to this invention, the power lines connected from all the USB hosts 103 are logically added by the circuit of diodes A07, and the result is applied through the USB hub D 105d to the USB device 104. The diodes A07 are for preventing the shorting which otherwise might be caused if there exists a USB host 103 for which power is not switched on.

As described above, power is kept supplied regardless of the switching control operation, and therefore the USB device is not subjected to hardware resetting.

Now, a means for causing the software resetting will be explained. The USB specification requires that whenever a new device is mounted, a signal indicating the mounting is applied to the USB hosts. In response to this signal, the USB hosts 103 issue a software reset command.

According to this invention, a pseudo-mounting signal is applied to the USB host 103 next to be connected before switching the route of a USB host 103, and the returned software reset command is absorbed at the switching section 109.

Specifically, a dynamic insertion and removal compensation circuit A00 in FIG. 10 sends a signal procedure indicating the mounting of a device through a D+ signal line A01 and a D– signal line A02 at the time of switching the USB hosts 103. Then, the connections A to C are switched as actual connection routes. After that, the software reset command (a combination of the D+ signal line A01 and the D– signal line A02) issued from a USB host 103 is applied to the USB device 104, thus executing the initialization of the USB device.

Figure 11:
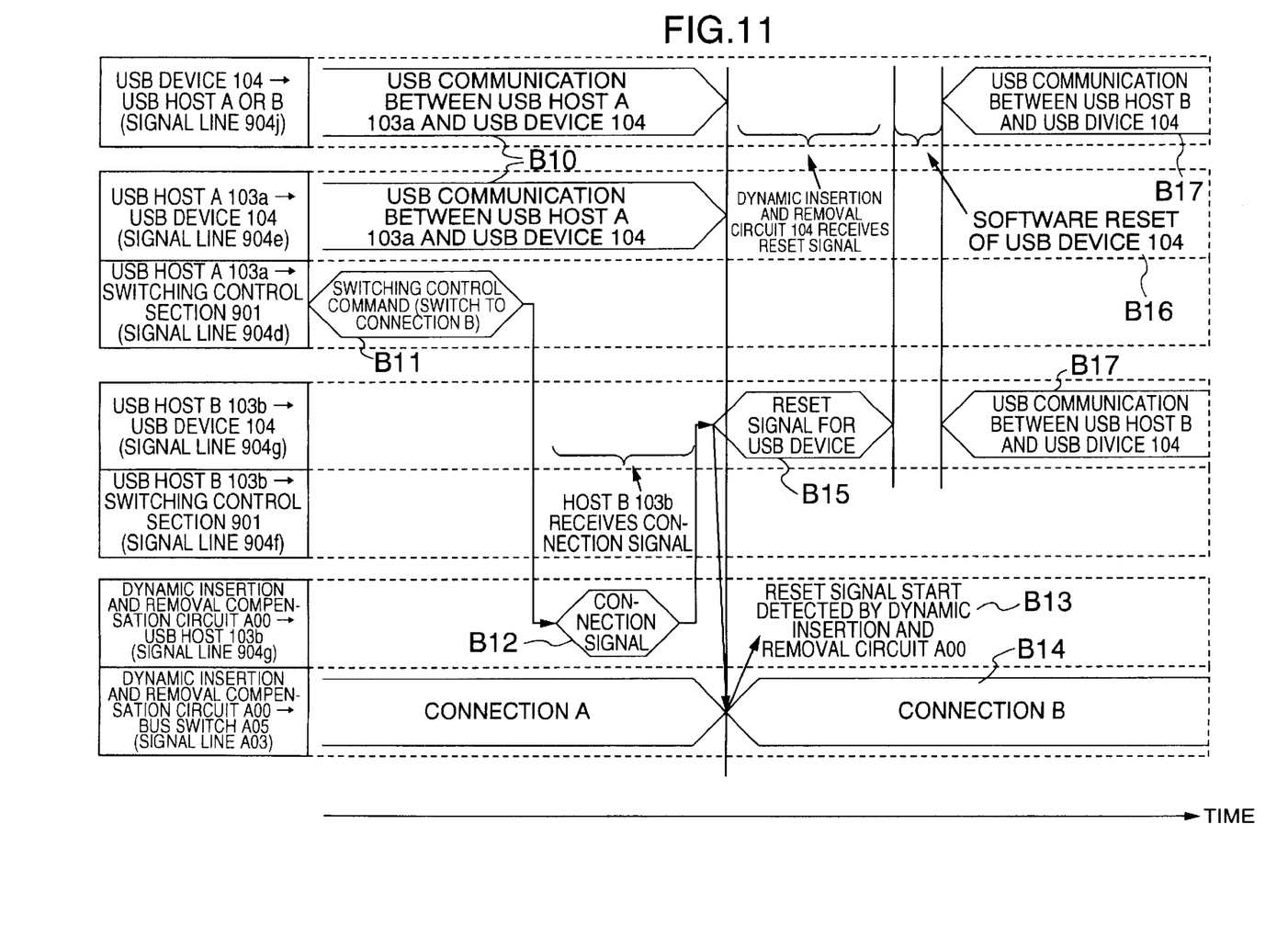
FIG. 11 is a time chart showing the state of each signal in the process of switching the switching section.

FIG. 11 shows an example time chart. First, assume that a connection route A is established from the USB hub A 105a to USB hub D 105d (step B10). The process for switching this route to the USB hub B 105b, i.e., to the connection route B will be explained.

FIG. 11 shows the lapse of time toward the right side thereof. First, in step B11, the USB host A 103a of FIG. 9 issues a control command to the switching control section 901 for switching to the connection route B. In step B12, the dynamic insertion and removal compensation circuit A00 outputs a signal indicating the mounting of the USB device 104 to the USB host B 103b next to be connected. In response to this signal, the USB host B 103b sends a software reset command signal to the USB device 104 in step B15.

The dynamic insertion and removal compensation circuit A00 detects the reset signal and switches the connection route from A to B (step B13). The reset signal from the USB host B 103b is applied through the hub D 105d to the USB device 104. Step B16 initializes the USB device 104 and clears the intermediate result of the internal process as a result of switching the host.

After that, step B17 establishes the connection between the USB device 104 completely reset and the new USB host B 103b.

By going through the procedure described above, the USB hosts 103 can be switched without any hardware resetting, thus solving the second problem.

In the USB specification, the signal procedure indicating the mounting of the USB device 104 and the reset command procedure from the USB hosts 103 are described in the above-cited UNIVERSAL SERIAL BUS SPECIFICATION version 1.0 (Jan. 15, 1996), pp. 116–117, 119.

As described above, the interface switching apparatus and the interface switching method according to the present invention have the first to seventh advantages described below.

A first advantage is that a USB device can be shared by a plurality of USB hosts.

A second advantage is that the hardware resetting of the UBS device which otherwise might be required according to the USB specification when switching the USB is eliminated, thereby reducing the time required until the USB device becomes usable after switching.

A third advantage is that the USB device can be switched in an operation interlocked with the failure of the cluster when a fault is detected in a host of the cluster system.

A fourth advantage is that a USB host can be switched without providing any new control interface between the USB host and the USB switch.

A fifth advantage is that the interface is prevented from being switched to an input route not connected with a valid USB host when switching the USB switching device, thereby improving the operating convenience of the user.

A sixth advantage is that the interfaces such as VGA and IEEE1394 other than USB can be switched at a time when switching the USB interface.

A seventh advantage is that a single USB keyboard can be shared among a plurality of USB hosts having different architectures.

What is claimed is:

1. A switching control method for a switch having a serial interface for selectively connecting one of a plurality of hosts with a device through a single route, said switch including a dynamic insertion and removal serial interface having a power supply and at least a pair of differential signal lines as an interface for connecting said hosts and said device, said method performed in said switch and comprising the steps of:

receiving a control command for switching the route through said serial interface from one of said hosts;

controlling the switching of said serial interface based on said control command;

in a case of detecting depression of a manual change-over switch capable of switching a connection route of said serial interface arbitrarily, determining the switching command from said one of said hosts with a predetermined priority; and switching the route between said one of said hosts and said device in accordance with said priority upon said detection of a depression of a manual change-over switch.

2. A switching control method for a switch having a serial interface for selectively connecting one of a plurality of hosts to a device through a single route, said switch including a dynamic insertion and removal serial interface having a power supply and at least a pair of differential signal lines as an interface for connecting said hosts and said device, said method performed in said switch and comprising the steps of:

checking a power supply line at said interface of one of said plurality of hosts to which said single route is to be switched; and invalidating, when it is determined in said checking step that a voltage sufficient for operating said device is not being supplied to said power supply line, a command for switching said single route to said one of said plurality of hosts.

3. A switching control method according to claim 2, wherein a USB (Universal Serial Bus) is applied to said serial interface.

4. A switching control method for a switch having a serial interface for selectively connecting one of a plurality of hosts to a device through a single route, said switch including a dynamic insertion and removal serial interface having a power supply and at least a pair of differential signal lines as an interface for connecting said hosts and said device, said method performed in said switch and comprising the steps of:

determining validity of said plurality of hosts connected thereto;

invalidating switching to any of said plurality of hosts recognized as an invalid connection:

providing a system for outputting a switching control signal for said switch;

producing said switching control signal from said system; and switching an interface other than the serial interface based on said switching control signal.

5. A switching control method according to claim 4, wherein a USB (Universal Serial Bus) is applied to said serial interface.

6. A switch including a serial interface for selectively connecting one of a plurality of hosts to a device through a single route, comprising:

a dynamic insertion and removal serial interface having a power supply and at least a pair of differential lines as a connection interface between said plurality of hosts, said device and said switch; and switching means for checking a power supply line at said interface of one of said plurality of hosts to which said single route is to be switched, and for invalidating, when it is determined by said checking that a voltage sufficient for operating said device is not being supplied to said power supply line, a command for switching said single route to said on of said plurality of hosts.

7. A switch including a serial interface for selectively connecting one of a plurality of hosts to a device through a single route, comprising:

a dynamic insertion and removal serial interface having a power supply and at least a pair of differential lines as a connection interface between said plurality of hosts, said device and said switch;

switching means for determining validity of the host connected thereto and for invalidating a command for switching to one of said hosts a connection which has been recognized as invalid;

a system for outputting a switching control signal for said switch; and interface switching means for switching an interface other than said serial interface based on said switching control signal.

* * * * *